(12) United States Patent
Wentzel et al.

(10) Patent No.: US 9,624,805 B2
(45) Date of Patent: Apr. 18, 2017

(54) AFTERTREATMENT SYSTEM HAVING DYNAMIC INDEPENDENT INJECTOR CONTROL

(71) Applicant: Caterpillar Inc., Peoria, IL (US)

(72) Inventors: Daniel Robert Wentzel, Chillicothe, IL (US); Brian Michael Cole, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 72 days.

(21) Appl. No.: 14/468,591

(22) Filed: Aug. 26, 2014

(65) Prior Publication Data

US 2016/0061079 A1 Mar. 3, 2016

(51) Int. Cl.
| F01N 3/00 | (2006.01) |
| F01N 3/10 | (2006.01) |
| F01N 3/20 | (2006.01) |
| F01N 13/00 | (2010.01) |
| F01N 3/035 | (2006.01) |

(52) U.S. Cl.
CPC .............. *F01N 3/208* (2013.01); *F01N 3/035* (2013.01); *F01N 3/103* (2013.01); *F01N 3/2066* (2013.01); *F01N 13/008* (2013.01); *F01N 2560/021* (2013.01); *F01N 2560/026* (2013.01); *F01N 2560/06* (2013.01); *F01N 2560/07* (2013.01); *F01N 2560/14* (2013.01); *F01N 2610/02* (2013.01); *F01N 2610/146* (2013.01); *F01N 2610/1453* (2013.01); *F01N 2900/08* (2013.01); *F01N 2900/1402* (2013.01); *F01N 2900/1404* (2013.01); *F01N 2900/1411* (2013.01); *F01N 2900/1602* (2013.01); *F01N 2900/1616* (2013.01); *F01N 2900/1808* (2013.01); *F01N 2900/1811* (2013.01); *F01N 2900/1812* (2013.01); *F01N 2900/1822* (2013.01)

(58) Field of Classification Search
CPC .............. F01N 2610/03; F01N 2610/02; F01N 3/2066; F01N 13/02
USPC .................................. 60/286, 295, 301, 303
See application file for complete search history.

(56) References Cited

U.S. PATENT DOCUMENTS

| 5,551,231 A * | 9/1996 | Tanaka | F01N 3/0842 60/289 |
| 6,125,629 A * | 10/2000 | Patchett | B01D 53/9431 60/284 |
| 6,761,025 B1 * | 7/2004 | Gladden | F01N 3/206 60/274 |

(Continued)

*Primary Examiner* — Thomas Denion
*Assistant Examiner* — Diem Tran
(74) *Attorney, Agent, or Firm* — Finnegan, Henderson, Farabow, Garrett & Dunner, LLP

(57) ABSTRACT

An aftertreatment system is provided for an engine. The aftertreatment system may have at least one exhaust passage and a plurality of reductant injectors that are controllable to dose reductant into the at least one exhaust passage. The aftertreatment system may also have at least one sensor configured to generate a signal indicative of an exhaust parameter and a controller in communication with each of the plurality of reductant injectors and the sensor. The controller may be configured to dynamically adjust the dosing of the plurality of injectors, wherein adjusting the dosing includes adjusting at least one of an injector timing, an injector sequence, and a grouping of the plurality of injectors that are simultaneously injecting based on the signal.

17 Claims, 1 Drawing Sheet

(56) References Cited

U.S. PATENT DOCUMENTS

| | | | |
|---|---|---|---|
| 8,371,106 B2* | 2/2013 | Itoh | B01D 53/9409 60/274 |
| 8,448,424 B2* | 5/2013 | Huang | F01N 3/2066 422/168 |
| 9,162,183 B2* | 10/2015 | Ancimer | F01N 3/208 |
| 2004/0098974 A1 | 5/2004 | Nieuwstadt et al. | |
| 2007/0122317 A1* | 5/2007 | Driscoll | B01D 53/90 422/170 |
| 2010/0242438 A1 | 9/2010 | Mital | |
| 2012/0204542 A1 | 8/2012 | Norris et al. | |
| 2013/0199160 A1 | 8/2013 | Kruer et al. | |
| 2014/0116027 A1 | 5/2014 | Ancimer | |

* cited by examiner

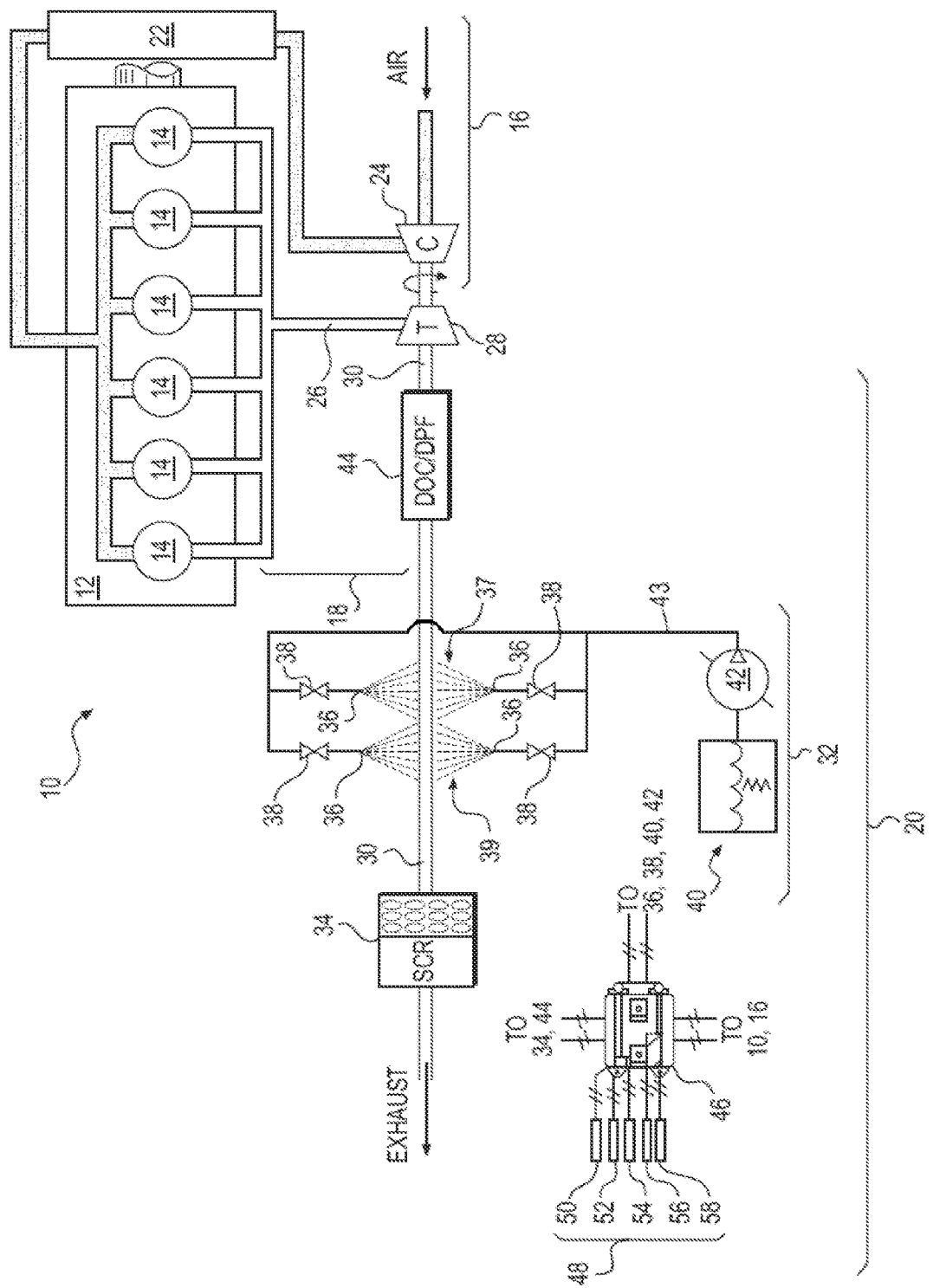

US 9,624,805 B2

AFTERTREATMENT SYSTEM HAVING DYNAMIC INDEPENDENT INJECTOR CONTROL

TECHNICAL FIELD

The present disclosure relates generally to an aftertreatment system and, more particularly, to an aftertreatment system having dynamic independent injector control

BACKGROUND

Internal combustion engines, including diesel engines, gasoline engines, gaseous fuel-powered engines, and other engines known in the art exhaust a complex mixture of air pollutants. These air pollutants can include, among other things, gaseous compounds such as the oxides of nitrogen ($NO_X$). Due to increased awareness of the environment, exhaust emission standards have become more stringent, and the amount of $NO_X$ emitted from an engine may be regulated depending on the type of engine, size of engine, and/or class of engine. In order to ensure compliance with the regulation of these compounds, some engine manufacturers have implemented a process called Selective Catalytic Reduction (SCR).

SCR is a process where a reductant (most commonly a urea/water solution) is injected into the exhaust gas stream of an engine and adsorbed onto a catalyst. The reductant reacts with $NO_X$ in the exhaust gas to form water ($H_2O$) and elemental nitrogen ($N_2$), both of which are unregulated. Care should be taken so that the amount of reductant injected into the exhaust gas stream corresponds with the amount of $NO_X$ in the exhaust gas stream. If too much reductant is injected, some of the reductant may pass through the exhaust system and be discharged into the atmosphere. This can be costly and violate regulations in some areas. If too little reductant is injected, the $NO_X$ may not be adequately reduced and some may pass through the exhaust system and be discharged into the atmosphere.

Despite the need for accurate control, reductant injection systems are limited in their functionality. For example, overall reductant injection flow rate is often the only adjustable input. Therefore, in response to exhaust flow fluctuation and exhaust system irregularities, it can be difficult to fine tune reductant injection in order to efficiently maintain the exhaust within regulatory limits.

One method of addressing this problem of limited control functionality is described by U.S. Patent Publication No. 2012/0204542 of Norris et al. that published on Aug. 16, 2012 ("the '542 publication"), which discloses an exemplary aftertreatment system. Specifically, the '542 publication describes a system having two exhaust legs configured to receive parallel flows of exhaust from an engine, and a controller configured to selectively adjust exhaust flow through the legs via a throttle to compensate for uneven flow distribution. The system includes a particulate filter disposed within each leg at a location upstream of an SCR catalyst. A hydrocarbon doser is positioned between each particulate filter and the corresponding SCR catalyst, and a sensor (e.g., an ammonia sensor, a $NO_X$ sensor, a temperature sensor, and/or a pressure sensor) is located downstream of each catalyst. The controller is configured to determine clogging of the particulate filters based on signals from the sensor, calculate uneven flow distribution through the legs based on the clogging, and selectively adjust exhaust flow to compensate for the uneven flow distribution. In addition, operation of the hydrocarbon dosers is controlled based on feedback from the sensor.

While the system of the '542 publication may have increased functionality that helps to maintain dosing accuracy during uneven exhaust flow, the system may still be less than optimal. For example, the system may not be capable of detecting or accommodating certain exhaust flow fluctuations and aftertreatment system irregularities.

The present disclosure is directed at overcoming one or more of the shortcomings set forth above and/or other problems of the prior art.

SUMMARY

In one aspect, the present disclosure is directed to an aftertreatment system. The aftertreatment system may include at least one exhaust passage and a plurality of reductant injectors that are controllable to dose reductant into the at least one exhaust passage. The aftertreatment system may also include at least one sensor configured to generate a signal indicative of an exhaust parameter and a controller in communication with each of the plurality of reductant injectors and the sensor. The controller may be configured to dynamically adjust the dosing of the plurality of injectors, wherein adjusting the dosing includes adjusting at least one of an injector timing, an injector sequence, and a grouping of the plurality of injectors that are simultaneously injecting based on the signal.

In another aspect, the present disclosure is directed to a method of dosing reductant. The method may include dosing reductant from injectors into an exhaust flow at a plurality of different locations along an exhaust passage. The method may also include detecting an exhaust parameter of the exhaust flow and dynamically adjusting the dosing for a defined period based on the detected exhaust parameter. Adjusting the dosing may include adjusting at least one of a dosing duration at each of the plurality of different locations, a dosing sequence of the plurality of different locations, and grouping of the plurality of different locations used to simultaneously inject reductant.

In yet another aspect, the present disclosure is direct to an engine. The engine may include an engine block at least partially defining a plurality of combustion chambers. The engine may also include an exhaust manifold extending from the plurality of combustion chambers and a turbocharger connected to the exhaust manifold. The engine may further include at least one exhaust passage connected to an outlet of the turbocharger and a plurality of reductant injectors that are controllable to release reductant into the at least one exhaust passage. The engine may further include at least one sensor configured to generate a signal indicative of an exhaust parameter and a controller in communication with each of the plurality of reductant injectors and the sensor. The controller may be configured to dynamically adjust the dosing of the plurality of injectors, wherein adjusting the dosing includes adjusting at least one of an injector timing, an injector sequence, and a grouping of the plurality of injectors that are simultaneously injecting based on the signal.

BRIEF DESCRIPTION OF THE DRAWING

FIG. 1 is a diagrammatic illustration of an engine having an exemplary disclosed aftertreatment system.

DETAILED DESCRIPTION

FIG. 1 illustrates an exemplary engine 10. For the purposes of this disclosure, engine 10 is depicted and described as a diesel-fueled, internal combustion engine. However, it is contemplated that engine 10 may embody any other type of combustion engine such as, for example, a gasoline engine or a gaseous fuel-powered engine burning compressed or liquefied natural gas, propane, or methane. Engine 10 may include an engine block 12 at least partially defining a plurality of cylinders 14, and a plurality of piston assemblies (not shown) disposed within cylinders 14 to form a plurality of combustion chambers (not shown). It is contemplated that engine 10 may include any number of combustion chambers and that the combustion chambers may be disposed in an in-line configuration (shown), in a "V" configuration, in an opposing-piston configuration, or in any other conventional configuration.

Multiple separate sub-systems may be associated within engine 10 and cooperate to facilitate the production of power. For example, engine 10 may include an air induction system 16, an exhaust system 18, and an aftertreatment system 20. Air induction system 16 may be configured to direct air or an air and fuel mixture into engine 10 for subsequent combustion. Exhaust system 18 may exhaust byproducts of combustion to the atmosphere. Aftertreatment system 20 may function to reduce the discharge of regulated exhaust constituents produced by engine 10 to the atmosphere.

Air induction system 16 may include multiple components configured to condition and introduce compressed air into cylinders 14. For example, air induction system 16 may include, among other things, an air cooler 22 located downstream of one or more compressors 24. Compressor(s) 24 may be connected to pressurize inlet air directed through cooler 22. It is contemplated that air induction system 16 may include different or additional components than described above such as, for example, a throttle valve, variable valve actuators associated with each cylinder 14, filtering components, compressor bypass components, and other known components that may be selectively controlled to affect an air-to-fuel ratio of engine 10, if desired. It is further contemplated that compressor(s) 24 and/or cooler 22 may be omitted, if a naturally aspirated engine is desired.

Exhaust system 18 may include multiple components that condition and direct exhaust from cylinders 14 to the atmosphere. For example, exhaust system 18 may include, among other things, an exhaust manifold 26 and one or more turbines 28 driven by exhaust flowing through manifold 26. Exhaust from turbine(s) 28 may be directed to aftertreatment system 20 via aftertreatment passage 30. It is contemplated that exhaust system 18 may include different or additional components than described above such as, for example, bypass components, an exhaust compression or restriction brake, an attenuation device, and other known components, if desired.

Each of turbine(s) 28 may be located to receive exhaust leaving engine 10, and may be connected to one or more compressors 24 of air induction system 16 by way of a common shaft to form a turbocharger. As the hot exhaust gases exiting engine 10 moves through turbine(s) 28 and expand against vanes (not shown) thereof, turbine(s) 28 may rotate and drive the connected compressor(s) 24 to pressurize inlet air.

Aftertreatment system 20 may include components configured to trap, catalyze, reduce, or otherwise remove regulated exhaust constituents from the exhaust flow of passage 30 prior to discharge to the atmosphere. For example, aftertreatment system 20 may include, among other things, a reductant injector system 32 and one or more catalyst substrates 34 located downstream from reductant injector system 32. Reductant injector system 32 may include a plurality of reductant injectors 36, a plurality of valves 38, a reductant supply 40, and a pump 42. In some embodiments, each injector 36 may be provided with a dedicated supply and a dedicated pump 42. In the disclosed embodiment, however, a single supply 40 and single pump 42 is in fluid communication with all injectors 36. In the disclosed embodiment, four reductant injectors 36 and four corresponding valves 38 are disclosed. However, in other embodiments more or less than four reductant injectors 36 and valves 38 may be included in reductant injector system 32. For example, in another embodiment, eight reductant injectors 36 and eight corresponding valves 38 may be included. In yet another embodiment, valves 38 may be associated with more than one injector 36. For example, one valve 38 may supply reductant fluid to two or more injectors 36.

Pump 42 may be configured to draw reductant from supply 40 and pressurize and pump the reductant via a conduit 43 through the corresponding valves 38 to reductant injectors 36, from which it may be dispensed into passage 30. Dispensing of reductant from reductant injectors 36 may be independently controlled by controlling operation of each individual valve 38 associated with each injector 36. The position of each valve 38 (e.g., opened, closed, or partially opened/closed) can determine whether reductant is dispensed from the associated reductant injector 36. For example, reductant may be dispensed from all the reductant injectors 36, for a defined dosing period, by opening all of the corresponding valves 38 for the duration of that dosing period. Alternatively, dispensing of reductant may be limited to one, two, or three reductant injectors 36 by opening only one, two, or three valves 38 during the dosing period. In other embodiments, valves 38 can be control valves where the position can be controlled between 0% and 100% open. The timing of when injectors 36 are dispensing reductant, the sequence of dosing by injectors 36, and the duration can also be controlled using valves 38.

Many arrangements for the reductant injectors 36 along and around the circumference of passage 30 may be possible. For example, reductant injectors 36 may be spaced (e.g., equally, increasingly, decreasingly) laterally along passage 30 at the same circumference position. Alternatively, reductant injectors 36 may all be positioned at the same location laterally along passage 30 and spaced around the circumference at that lateral position. In yet another example, as shown in FIG. 1, reductant injectors 36 may grouped in pairs and a first pair 37 of reductant injectors 36 may be positioned at substantially the same lateral position. A second pair 39 of reductant injectors 36 may also be positioned at substantially the same lateral position. Second pair 39 may be positioned downstream of first pair 37 along passage 30. This configuration can limit or prevent deposit formation associated with lower reductant injectors 36. It is contemplated that the number of pairs of reductant injectors 36 in reductant injector system 32 may vary as needed based on the application of the reductant injector system 32.

Each pair (e.g., first pair 37 and second pair 39) of reductant injectors 36 may be spaced a specified number of degrees apart around the circumference of passage 30. For example, reductant injectors 36 may be spaced about 30 degrees apart around the circumference of passage 30. The position of first pair 37 and second pair 39, around the circumference of passage 30, may correspond (e.g., be substantially the same) or may not correspond (e.g., be offset).

Supply 40 may contain a gaseous or liquid reductant, most commonly urea (($NH_2$)$_2$CO), a water/urea mixture, a hydrocarbon such as diesel fuel, or ammonia gas ($NH_3$). Reductant injector system 32 may be configured such that the reductant may be sprayed or otherwise advanced into the exhaust flow of passage 30 at one or more locations upstream of catalyst substrate(s) 34 by reductant injector(s) 36. This process of injecting reductant upstream of catalyst substrate(s) 34 is known as dosing.

Catalyst substrates 34 may be arranged into bricks or packs, which are placed in parallel and/or series relative to the flow of exhaust in passage 30. For example, an arrangement of multiple individual substrates 34 may be arranged to receive exhaust flow from passage 30 in parallel circuits with each other. In this configuration, a primary exhaust flow from passage 30 may be divided between the different substrates 34, pass through the substrates 34, and then rejoin into a single flow again at a location downstream of the substrates 34. In other configurations, the exhaust from passage 30 may pass through multiple layers of substrates 34 as a single flow or through multiple layers of substrates 34 wherein the substrates of each layer are arranged in parallel with each other. Many different configurations may be possible. Reductant injectors 36 may be positioned such that each reductant injector 36 is associated with one or more catalyst substrates 34.

The reductant sprayed into passage 30 may flow downstream with the exhaust from engine 10 and be adsorbed onto an upstream surface of catalyst substrate(s) 34, where the reductant may react with $NO_X$ (NO and $NO_2$) in the exhaust gas to form water ($H_2O$) and elemental nitrogen ($N_2$), both of which may be unregulated. This process performed by substrate(s) 34 may be most effective when a concentration of NO to $NO_2$ supplied to substrate(s) 34 is about 1:1.

To help provide the correct ratio of NO to $NO_2$, an oxidation catalyst 44 may be located upstream of substrates 34 and injectors 36 along passage 30, in some embodiments. Oxidation catalyst 44 may be, for example, a diesel oxidation catalyst (DOC). As a DOC, oxidation catalyst 44 may include a porous ceramic honeycomb structure or a metal mesh substrate coated with a material, for example a precious metal, which catalyzes a chemical reaction to alter the composition of the exhaust. For instance, oxidation catalyst 44 may include a washcoat of palladium, platinum, vanadium, or a mixture thereof that facilitates the conversion of NO to $NO_2$.

In one embodiment, oxidation catalyst 44 may also perform particulate trapping functions. That is, oxidation catalyst 44 may be a catalyzed particulate trap such as a continuously regenerating particulate trap or a catalyzed continuously regenerating particulate trap. As a particulate trap, oxidation catalyst 44 may function to trap or collect particulate matter.

Aftertreatment system 20 may also include components configured to help regulate the treatment of exhaust by reductant injector system 32 prior to discharge to the atmosphere. Specifically, aftertreatment system 20 may include a controller 46 in communication with one or more sensors 48, the components of aftertreatment system 20 (e.g., catalyst substrate 34, reductant injectors 36, valves 38, supply 40, pump 42, and oxidation catalyst 44), and engine 10. The one or more sensors 48 may generate a signal indicative of an exhaust parameter. Based on the signal indicative of the exhaust parameter, controller 46 may determine, for example, an amount of $NO_X$ being produced by engine 10, a performance parameter of catalyst substrates 34 (e.g., a reduction efficiency), a history of the performance parameter (e.g., the reduction efficiency tracked over a period of time), an amount of reductant passing through catalyst substrates 34, a failure of any one or more of the components of reductant injector system 32, and/or an amount of reductant that should be sprayed by reductant injectors 36 into the exhaust flow of passage 30 to sufficiently reduce the $NO_X$ present within the exhaust in light of current conditions (e.g., in light of any known irregularities such as component failures, inefficiencies, low-dosing events, etc.). Controller 46 may then independently and dynamically regulate operation of each reductant injector 36 to inject (or stop injecting) an appropriate amount of reductant into the exhaust flow of passage 30 such that an overall level of exhaust constituents being discharged to the atmosphere by passage 30 is less than a desired and/or regulated level.

The one or more sensors 48 may include any type of sensors known in the art that are configured to provide a signal indicative of an exhaust parameter. An exhaust parameter can include parameters associated with, for example, exhaust flow and/or components operational state. Exhaust flow parameters can include, for example, temperature, pressure, mass flow rate, constituent levels, and other like parameters. Components operational state parameters can include, for example, the operational state (e.g., on, off, running, level, failure, etc.) of components such as injectors 36, valves 38, supply 40, pump 42, catalyst substrate 34, and oxidation catalyst 44. Component operational state parameters can also include parameters indicative of the reductant flow through reductant injector system 32, for example, reductant pressure, flow rate, temperature, concentration, etc. These parameters can be independently measured at points in-line with each injector 36 or can be measured in a common passage and/or at a common location, for example, at the outlet passage from pump 42.

According to an exemplary embodiment, sensors 48 may include a plurality of sensors configured to generate signals indicative of one or more exhaust parameters. Examples of several sensors that may be included in the plurality of sensors 48, according to an exemplary embodiment are described in more detail below.

A first sensor 50 may embody a constituent sensor configured to generate a constituent signal indicative of a presence and/or concentration of a particular constituent within the exhaust flow of passage 30 at a location upstream and/or downstream of catalyst substrates 34. For instance, sensor 48 may be a $NO_X$ sensor configured to determine an amount (i.e., a quantity, a relative percent, a ratio, etc.) of NO and/or $NO_2$ present within the exhaust of engine 10. Sensor 48 may generate the constituent signal and send it to controller 46 for further processing.

A second sensor 52 of aftertreatment system 20 may embody a reductant sensor configured to generate a slip signal indicative of a presence of reductant within the exhaust flow of passage 30 downstream of catalyst substrate 34. Second sensor 52 may generate the slip signal and send it to controller 46 for further processing.

A third sensor 54 of aftertreatment system 20 may be associated with valves 38, supply 40, pump 42, and/or injectors 36. For example, sensor 54 may be a fluid level sensor, a temperature sensor, and/or a pressure sensor configured to generate a reductant signal indicative of an amount of reductant available (e.g., an amount of reductant remaining and/or thawed) for injection. Alternatively, third sensor 54 could be configured to generate a signal indicative of a displacement position of pump 42, position of valve 38, a pressure of injector 36, a flow rate of reductant from pump 42, a flow rate of reductant to each injector 36, and/or a functional status (e.g., component failure) of pump 42, valves 38, and injectors 36. This signal may be directed from sensor 54 to controller 46 for further processing. It is contemplated that aftertreatment system 20 may include a plurality of third sensors 54, such that a third sensor is associated with at least supply 40, pump 42, each valve 38, and each injector 36.

A fourth sensor 56 of aftertreatment system 20 may be a mass flow sensor in-line with passage 30 and configured to generate a signal indicative of a mass flow rate of exhaust from engine 10. Fourth sensor 56 may also include a temperature sensor configured to generate a signal indicative of a temperature of exhaust through passage 30. These signals may be directed from sensor 56 to controller 46 for further processing. Fourth sensor 56 may be positioned anywhere along passage 30. For example, fourth sensor 56 may be positioned upstream of oxidation catalyst 44, between oxidation catalyst 44 and reductant injector system 32, between reductant injector system 32 and catalyst substrate 34, or downstream of catalyst substrate 34.

A fifth sensor 58 of aftertreatment system may be associated with catalyst substrate 34 and configured to generate a signal indicative of the temperature of the catalyst substrate 34 and/or catalyst substrate 34 degradation.

It is contemplated that sensors 48 could be fewer or greater in number, have different functionality, and/or be associated with different components of aftertreatment system 20, if desired. It is also contemplated that any one or more of sensors 48 may alternatively embody a virtual sensor. A virtual sensor may produce a model-driven estimate based on one or more known or sensed operational parameters of engine 10 and/or aftertreatment system 20. For example, based on a known operating speed, load, temperature, boost pressure, ambient conditions (humidity, pressure, temperature, etc.), and/or other parameters of engine 10, a model may be referenced to determine an amount of NO and/or $NO_2$ produced by engine 10. Similarly, based on a known or estimated $NO_X$ production of engine 10, a flow rate of exhaust exiting engine 10, and/or a temperature of the exhaust, the model may be referenced to determine an amount of NO and/or $NO_2$ leaving catalyst 44 and entering catalyst substrate 34. As a result, any signal (e.g., the constituent production signal) directed from sensor 48 to controller 46 may be based on calculated and/or estimated values rather than direct measurements, if desired. It is contemplated that rather than a separate element, these virtual sensing functions may alternatively be accomplished by controller 46, if desired.

Controller 46 may embody a single or multiple microprocessors, field programmable gate arrays (FPGAs), digital signal processors (DSPs), etc. that include a means for controlling an operation of engine 10 in response to signals received from the various sensors. Numerous commercially available microprocessors can be configured to perform the functions of controller 46. It should be appreciated that controller 46 could readily embody a microprocessor separate from that controlling other non-exhaust related engine functions, or that controller 46 could be integral with a general engine microprocessor and be capable of controlling numerous engine functions and modes of operation. If separate from a general engine microprocessor, controller 46 may communicate with the general engine microprocessor via data links or other methods. Various other known circuits may be associated with controller 46, including power supply circuitry, signal-conditioning circuitry, actuator driver circuitry (i.e., circuitry powering solenoids, motors, or piezo actuators), communication circuitry, and other appropriate circuitry.

As will be described in the following section, the signals from sensors 48 (e.g., first sensor 50, second sensor 52, third sensor 54, fourth sensor 56, and fifth sensor 58) may be utilized by controller 46 to analyze the past, present, or future state of operation of aftertreatment system 20 and, based on this analysis, dynamically adjust the operation of each independent reductant injector 36 to maintain engine 10 compliant with emission regulations.

INDUSTRIAL APPLICABILITY

The aftertreatment system of the present disclosure may be applicable to any engine where consistent emission control is desired. The disclosed aftertreatment system can provide increased functionality for responding to exhaust flow fluctuations and system irregularities. The disclosed aftertreatment system may be particularly applicable to diesel engines for use in maintaining $NO_X$ produced by the engines below regulated levels. Operation of aftertreatment system 20 will now be described in detail.

During operation of engine 10, aftertreatment system 20 may experience exhaust flow fluctuation due to any number of different irregularities that have the potential to negatively affect exhaust emissions. If not otherwise accounted for, these fluctuations and irregularities could result in the forced shutdown of engine 10, causing a loss of productivity, a derating of the engine, and/or stranding the associated machine away from service. The exhaust flow fluctuations can be regular or irregular fluctuations. Examples of the different irregularities can include system degradation, system or component failure, and low-dosing events. The adjustment of reductant injectors 36 by controller 46, as described herein, in response to the fluctuations and various irregularities may be implemented in a variety of ways. One method by which controller 46 may implement adjustment of injectors 36 will now be described in detail.

Controller 46 may be configured to implement a defined dosing period. The defined dosing period may be fixed or variable in duration and may be hard coded or programmable. The defined dosing period may vary from, for example, about 1 second to 5 minutes. Controller 46 may be programmed to divide the defined dosing period (e.g., 1 second) into sub-periods corresponding to the number of injectors 36. Controller 46 may be programmed to divide the defined dosing period into equal sub-periods, or for some embodiments, unequal sub-periods. For example, a 1 second defined dosing period can be divided into four equal consecutive sub-periods of 0.25 seconds for reductant injector system 32, which has four injectors 36. For example, a first sub-period can span from 0 to 0.25 seconds, a second sub-period can span from 0.25 to 0.50 seconds, a third sub-period can span from 0.50 to 0.75 seconds, and a fourth sub-period can span from 0.75 to 1.0 second. Controller 46 may be programmed to assign one or more injectors 36 to one or more of the sub-periods. Reductant injector system 32 may be configured such that assigning an injector 36 to a sub-period causes valve 38 corresponding with that injector 36 to open and dispense reductant for the duration of the assigned sub-period.

According to an exemplary embodiment, based on the numerous injector assignment scenarios as described herein, controller 46 may adjust dosing by, for example, adjusting an injector timing (e.g., by adjusting a start of injection time, an end of injection time, a length of sub-periods or number of sub-periods injector is assigned to), adjusting an injector sequence (e.g., by adjusting sub-period assignments), and adjusting grouping of the injectors 36 that fire together during the same dosing period. A nearly infinite number of injector sub-period assignment scenarios are possible. Described below are just a few examples of the numerous possibilities. All four injectors 36 can be assigned to the same sub-period (e.g., first sub-period, second sub-period, third sub-period, and fourth sub-period). All four injectors 36 can be assigned to all the sub-periods. Each injector can be assigned to a different sub-period. Two injectors 36 can be assigned to the first sub-period and two injectors 36 can be assigned to the third sub-period.

According to an exemplary embodiment, controller 46 may be configured such that at the end of a defined dosing period, the reductant dispensing sequence is restarted and a newly defined dosing period is initiated. Between each defined dosing period, controller 46 can be configured to maintain the injector 36 sub-period assignments or controller 46 may modify them based on one or more signals received from sensors 48. Controller 46 may also be configured such that the defined dosing period may dynamically decrease or increase in duration in response to the detection of exhaust flow fluctuation or an irregularity. For example, during steady state operation (e.g., minimal fluctuation and/or no irregularities), the defined dosing period may be longer (e.g., greater than 30 seconds), whereas if a fluctuation or irregularity is detected, the defined dosing period can be decreased such that controller 46 can respond faster to changes in sensed exhaust parameters. Controller 46 may also be configured to end a defined dosing period prior to the conclusion in order to adjust dosing (e.g., duration of defined dosing period, number of sub-periods, and injector assignments).

Controller 46 may be configured to reference lookup tables, databases, operational models, or other sources based on one or more signals from sensors 48, the exhaust parameter, and/or the detected irregularity and based on the reference set the defined dosing period and the reductant injectors 36 assignments. Controller 46 may reference these sources periodically or continuously and may also update the defined dosing period and reductant injectors 36 assignments at the same regularity.

The numerous assignment possibilities provides controller 46 with functionality such that it can effectively respond to fluctuations and/or irregularities (e.g., system degradation, system or component failure, and low-dosing events) and maintain exhaust emissions within regulatory limits. Adjustment by controller 46 to exhaust flow fluctuation and these example irregularities will be explored below to further illustrate the disclosed concepts.

Fluctuation of exhaust flow may be a regular or irregular occurrence that is exhibited in a variety of ways and triggered by a variety of situations. For example, substantial fluctuation of exhaust flow may be exhibited as a fluctuation of the temperature, pressure, mass flow rate, and/or constituent concentration. Substantial fluctuation may be defined as a change of any of these parameters by an amount greater than, for example, about 10% within a period of, for example, about 30 seconds. Substantial fluctuation of exhaust flow may be triggered by, for example, irregular operating conditions of engine 10, and startup and shutdown of engine 10. A traditional aftertreatment system may be limited to adjusting only the total flow rate of reductant in response to fluctuations. Such limited functionality may prevent effective response (e.g., maintain emission within regulations) to substantial fluctuations.

In contrast, controller 46 may adjust dosing of reductant by adjusting one or more of reductant injectors 36 timing, reductant injectors 36 sequence, and reductant injectors 36 grouping. For example, if during normal operation, reductant injector system 32 has four injectors 36 each assigned to a different sub-period, in response to a fluctuation, controller 46 may adjust reductant injectors 36 timing. Reductant injectors 36 timing may be adjusted by increasing or decreasing the defined dosing period, which can correspondingly also increase or decrease each sub-period. Controller 46 could also be configured to respond to a fluctuation (e.g., spike in NOx detected upstream of the reductant injectors 36) by adjusting the reductant injectors 36 sequence by rearranging the sub-period assignments for the next newly defined dosing period. For example, the sequence of the reductant injectors 36 can be arranged so that dosing corresponds (e.g., based on the exhaust flow rate) with the volume of exhaust having elevated levels of NOx.

Controller 46 could also be configured to respond to a fluctuation by adjusting the reductant injectors 36 grouping. For example, two or more reductant injectors 36 could be grouped by assigning them all to one or more of the same sub-periods. Grouping of reductant injectors 36 during dosing can affect the performance of reductant injector system 32. For example, reductant injector system 32 can be configured such that grouping of injectors 36 reduces the quantity dosed by each injector 36 when compared to the quantity dosed by each reductant injector 36 when isolated (i.e., dosed individually) because of the limitations of a common supply 40 and pump 42. When only a single reductant injector 36 is dosing, all of the pressure and flow from pump 42 is supplied to the single reductant injector 36, whereas when reductant injectors 36 are grouped the pressure and flow is divided between the reductant injectors 36. However, it is contemplated that pump 42 and reductant injector system 32 can be sized such that there is no difference in dosing whether one or more reductant injectors 36 are dosing individually or simultaneously. Accordingly, if maximum dosing is desired, controller 46 can group, for example, all the reductant injectors 36 by assigning all of them to all of the sub-periods.

Controller 46 may also be configured to adjust dosing of reductant injectors 36, in response to fluctuation of an exhaust parameter (e.g., temperature). For example, aftertreatment system 20 at a given temperature and mass flow rate for exhaust flow may need to inject 0.2 liters of reductant equally by four reductant injectors 36 at the same time, but for a colder temperature and same mass flow rate it may be advantageous to have the same amount injected by only the three upstream reductant injectors 36 and, rather than simultaneously, the reductant injector 36 can dose sequentially. This arrangement may be advantageous because it may be determined that at the colder temperature the exhaust flow would be too cold upon reaching the downstream reductant injector 36 and as a result the reductant would condense on the wall of passage 30; however according to the present disclosure such a condensation may be prevented by injecting smaller quantities of reductant over several discrete time periods, thereby allowing each discrete injection amount time to fully evaporate before condensation could occur. Controller 46 can be configured to respond to numerous exhaust parameter fluctuations and combinations of fluctuations.

System degradation is an example of an irregularity that may be a normally occurring phenomenon that is exhibited by a slow reduction in $NO_X$ conversion efficiency over time. In particular, over time, catalyst substrates 34 may age and lose their ability to convert $NO_X$ to $H_2O$ and $N_2$. This reduction in efficiency can be exhibited by an increase in an amount of $NO_X$ detected downstream of catalyst substrates 34 and/or an increase in an amount of reductant injected into the exhaust at an upstream location in order to sufficiently reduce the amount of $NO_X$ normally present in the exhaust. In some instances, the reduction in efficiency may be caused by only one catalyst substrate 34 and/or one brick of substrates 34. That is, the different catalyst substrates 34 of a particular aftertreatment system 20 may not age at the same rate.

In response to detecting a reduction in $NO_X$ conversion efficiency of a particular catalyst substrate 34 (e.g., catalyst degradation), there are many different adjustments that can be made by controller 46. The arrangement of catalyst substrates 34 and reductant injectors 36 may be such that certain injectors 36 may be associated with certain catalyst substrates 34. Therefore, one adjustment that can be made by controller 46 is for more reductant to be dosed by reductant injector 36 associated with the underperforming catalyst substrate 34. While this may be effective in some situations, in other situations an increase in reductant injections may only serve to waste reductant without significantly improving $NO_X$ conversion. Alternatively, instead of increasing dosing by the reductant injector 36 associated with the degraded catalyst substrate 34 controller 46 may be configured to decrease or eliminate dosing by that injector 36 and increase dosing by one or more of the other reductant injectors 36. This can be implemented by controller 46 by reassigning the sub-periods or recalculating the duration of the sub-periods. In this example, although the $NO_X$ conversion of the underperforming catalyst substrate(s) 34 may not improve, the conversion of $NO_X$ in the other catalyst substrate(s) 34 may improve enough to offset the higher levels of $NO_X$ being discharged from the underperforming catalyst substrate(s). In particular, for a given engine 10, the sum of emissions discharged from all the catalyst substrates 34 is what is regulated and not the emissions discharged from each individual catalyst substrate.

Component failure is another example of an irregularity and many different types of component failures may be possible. For example, one or more valves 38 may fail to open or close, one or more injectors 36 may become clogged, reductant could freeze (e.g., a heater and/or temperature sensor associated with the supply 40 may fail) causing the failure of valves 38 and/or injectors 36, pump 42 may be damaged or leaking, injectors 36 may inject an amount of reductant different from what is desired, etc. When a system failure occurs, reductant may not be injected at all or injected in an amount different than that required to adequately reduce $NO_X$ without wasting reductant. These failures can be detected in any number of different ways (e.g., based on $NO_X$ detection, reductant detection, flow detection, temperature detection, pressure detection, etc.). In addition, controller 46 may determine system failure based on signals generated by the failed components themselves and/or based on signals generated by other engine systems. That is, it may be possible for controller 46 to not detect the failure directly, but instead simply receive notification of a failure.

If normal operation of reductant injector system 32, for example, has four injectors 36, each one assigned a different sub-period (e.g., 0.25 seconds) and injector 36 assigned to the third sub-period fails (e.g., component failure of injector 36 or valve 38), controller 46 can adjust assignment of the injectors 36 in a variety of different ways. In a system lacking independent control of the injectors 36, the only option may be to increase the flow amount of the three remaining injectors evenly by 33% to account for the lack of flow from the fourth failed injector 36. However, for some aftertreatment systems, such an arrangement could create other problems, for example, deposit build up on one or more of the injectors 36. In contrast, aftertreatment system 20 may be configured such that instead of increasing flow amount evenly to each remaining injector, controller 46 may shift the entire load from the failed injector 36 that was assigned to the third sub-period to the injector 36 that had been assigned to the fourth sub-period so that injector 36 is assigned to both the third and fourth sub-periods while the other injectors 36 may be each assigned to just one of the first and second sub-periods. In another embodiment, controller 46 may be configured such that, in response to an injector or valve failure, the number of sub-periods can be recalculated based on the number of operational injectors 36.

Low-dosing events are another example of an irregularity that may be experienced by aftertreatment system 20. In some operations and/or applications (e.g., during idling and/or operation at low load and speed), the amount of reductant that each reductant injector 36 is commanded to inject may be so low that injection accuracy is negatively affected. In particular, there may be a low-dosing limit for each injector 36, below which injectors 36 cannot reliably dose reductant with a desired degree of accuracy. If unaccounted for, engine 10 could potentially violate regulations and discharge more $NO_X$ than desired at these times, even though reductant injectors 36 are being commanded to dose the correct amounts of reductant. The low-dosing event may be determined based on the amount of $NO_X$ detected within passage 30, based on the amount of reductant detected downstream of catalyst substrate(s) 34, and or based on a monitored speed and/or load of engine 10. Due to the functionality of controller 46 and the independent controllability of reductant injectors 36, rather than lowering the flow rate of all the reductant injectors 36 to below a low-dosing limit, controller 46 can instead reduce the number of reductant injector 36 assignments. For example, the number of reductant injectors 36 assigned for a defined dosing period can be reduced from four down to one or fewer so the reductant flow rate from the lesser reductant injectors 36 is greater. Alternatively, the duration of dosing by reductant injector 36 may also be adjusted. For example, all the reductant injectors 36 could continue to dose, but the reductant may be dosed at an increased flow rate for less time so the overall dosing quantity remains the same. These are just a few examples of how controller 46 may adjust operation of reductant injectors 36 to avoid low-dosing events. It is contemplated that controller 46 may dynamically adjust operation of reductant injectors 36 in other ways.

As discussed herein, several advantages may be associated with the disclosed aftertreatment system. The disclosed aftertreatment system provides enhanced functionality and improved performance for responding to exhaust flow fluctuation and irregularities. It will be apparent to those skilled in the art that various modifications and variations can be made to the aftertreatment system of the present disclosure without departing from the scope of the disclosure. Other embodiments will be apparent to those skilled in the art from consideration of the specification and practice of the aftertreatment system disclosed herein. It is intended that the specification and examples be considered as exemplary only, with a true scope of the disclosure being indicated by the following claims and their equivalents.

What is claimed is:

1. An aftertreatment system, comprising:
    at least one exhaust passage;
    a plurality of reductant injectors that are controllable to dose reductant into the at least one exhaust passage;
    at least one sensor configured to generate a signal indicative of an exhaust parameter; and
    a controller in communication with each of the plurality of reductant injectors and the sensor, the controller being configured to
        determine a defined dosing period based on the signal, the dosing period including a duration for which the reductant injectors dose reductant;
        divide the defined dosing period into a first number of sub-periods based on a second number of the reductant injectors;
        assign at least one of the reductant injectors to at least one of the sub-periods, the at least one injector being configured to dose reductant only during the at least one of the sub-periods;
        adjust an injector timing for at least one of the reductant injectors; and
        start a newly defined dosing period following conclusion of a preceding defined dosing period.

2. The aftertreatment system of claim 1, further including a plurality of valves, wherein one of the plurality of valves is in-line with each of the reductant injectors and the plurality of reductant injectors are independently controllable by opening and closing of the plurality of valves.

3. The aftertreatment system of claim 1, wherein the controller is configured to adjust dosing of the plurality of reductant injectors to maintain an overall consistent discharge of exhaust emissions from the at least one exhaust passage.

4. The aftertreatment system of claim 1, wherein the controller is configured to select a subset of the reductant injectors configured to dose reductant simultaneously.

5. The aftertreatment system of claim 1, wherein the controller is configured to adjust a sequence of dosing of the reductant injectors.

6. The aftertreatment system of claim 1, wherein the duration of each sub-period is equal.

7. The aftertreatment system of claim 5, wherein the controller is configured to adjust the sequence by adjusting assignment of the reductant injectors to the sub-periods.

8. The aftertreatment system of claim 4, wherein the controller is configured to adjust a grouping of the plurality of reductant injectors by adjusting assignment of the sub-periods.

9. The aftertreatment system of claim 1, wherein the exhaust parameter can include at least one of NOx quantity, a reductant dosing rate, an exhaust mass flow rate, an exhaust temperature, a catalyst substrate temperature, and a catalyst substrate degradation.

10. A method of dosing reductant, comprising:
    dosing reductant from one or more injectors into an exhaust flow at a plurality of different locations along an exhaust passage;
    detecting an exhaust parameter of the exhaust flow;
    determining a defined dosing period based on the exhaust parameter, the dosing period including a duration for which the injectors dose reductant;
    dividing the defined dosing period into a first number of sub-periods based on a second number of the injectors;
    assigning at least one of the injectors to at least one of the sub-periods, the at least one injector being configured to dose reductant only during the at least one of the sub-periods; and
    starting a newly defined dosing period following conclusion of a preceding defined dosing period.

11. The method of claim 10, wherein the exhaust parameter can include at least one of NOx quantity, a reductant dosing rate, an exhaust mass flow rate, an exhaust temperature, a catalyst substrate temperature, and a catalyst substrate degradation.

12. The method of claim 10, wherein dynamically adjusting the dosing based on the exhaust parameter maintains an overall consistent discharge of exhaust emissions.

13. The method of claim 10, wherein the first number is equal to the second number.

14. The method of claim 13, further including adjusting a dosing sequence of a plurality of locations, or selecting a subset of the locations for simultaneously injecting reductant.

15. The method of claim 13, further including adjusting an injector timing for at least one of the injectors.

16. The method of claim 14, further including adjusting at least one of a sequence of dosing by the one or more injectors and a grouping of the one or more injectors by adjusting the one or more injectors sub-period assignments.

17. An engine, comprising:
    an engine block at least partially defining a plurality of combustion chambers;
    an exhaust manifold extending from the plurality of combustion chambers;
    a turbocharger connected to the exhaust manifold;
    at least one exhaust passage connected to an outlet of the turbocharger;
    a plurality of reductant injectors that are controllable to release reductant into the at least one exhaust passage;
    at least one sensor configured to generate a signal indicative of an exhaust parameter; and
    a controller in communication with each of the plurality of reductant injectors and the sensor, the controller being configured to:
        determine a defined dosing period based on the signal, the dosing period including a duration for which the reductant injectors dose reductant;
        divide the defined dosing period into a first number of sub-periods based on a second number of the reductant injectors;
        assign at least one of the reductant injectors to at least one of the sub-periods, the at least one reductant injector being configured to dose reductant only during the at least one of the sub-periods; and
    start a newly defined dosing period following conclusion of a preceding defined dosing period.

* * * * *